US012662596B2

(12) United States Patent
Klostermann et al.

(10) Patent No.: US 12,662,596 B2

(45) Date of Patent: Jun. 23, 2026

(54) USE OF POLYAMINE- AND/OR POLYALKANOLAMINE-BASED CARBOXYLIC ACID DERIVATIVES IN AQUEOUS POLYURETHANE DISPERSIONS

(71) Applicant: Evonik Operations GmbH, Essen (DE)

(72) Inventors: Michael Klostermann, Essen (DE); Jan Marian Von Hof, Bochum (DE); Kai-Oliver Feldmann, Essen (DE); Marvin Jansen, Essen (DE)

(73) Assignee: Evonik Operations GmbH, Essen (DE)

( * ) Notice: Subject to any disclaimer, the term of this patent is extended or adjusted under 35 U.S.C. 154(b) by 898 days.

(21) Appl. No.: 17/705,359

(22) Filed: Mar. 27, 2022

(65) Prior Publication Data

US 2022/0306861 A1 Sep. 29, 2022

(30) Foreign Application Priority Data

Mar. 29, 2021 (EP) .................................... 21165440

(51) Int. Cl.

| | |
|---|---|
| ***C08L 79/02*** | (2006.01) |
| ***C08J 9/12*** | (2006.01) |
| ***C08J 9/30*** | (2006.01) |
| ***C08K 5/09*** | (2006.01) |
| ***C09D 175/04*** | (2006.01) |
| ***D06N 3/00*** | (2006.01) |

(52) U.S. Cl.

CPC ................. *C08L 79/02* (2013.01); *C08J 9/12* (2013.01); *C08J 9/30* (2013.01); *C08K 5/09* (2013.01); *C09D 175/04* (2013.01); *D06N 3/0047* (2013.01); *C08J 2205/04* (2013.01); *C08J 2375/04* (2013.01); *C08L 2201/50* (2013.01); *D06N 2211/28* (2013.01)

(58) Field of Classification Search

CPC combination set(s) only.

See application file for complete search history.

(56) References Cited

U.S. PATENT DOCUMENTS

| | | | | |
|---|---|---|---|---|
| 4,543,144 | A | 9/1985 | Thoma et al. | |
| 6,710,120 | B2 | 3/2004 | Gertzmann et al. | |
| 9,701,791 | B2 * | 7/2017 | Rose | C07C 219/08 |
| 12,275,823 | B2 | 4/2025 | Lobert et al. | |
| 2003/0191273 | A1 | 10/2003 | Gertzmann et al. | |
| 2004/0109992 | A1 | 6/2004 | Gribble et al. | |
| 2006/0079635 | A1 | 4/2006 | Pohl et al. | |
| 2007/0071972 | A1 * | 3/2007 | McCoy | D01F 6/60 524/556 |
| 2010/0234631 | A1 | 9/2010 | Misske et al. | |
| 2010/0273939 | A1 * | 10/2010 | Stollmaier | C08G 18/3218 558/302 |
| 2015/0284902 | A1 | 10/2015 | Bhattacharjee et al. | |
| 2019/0300728 | A1 | 10/2019 | Klostermann et al. | |
| 2020/0207938 | A1 | 7/2020 | Klostermann et al. | |
| 2022/0315709 | A1 | 10/2022 | Reibold et al. | |
| 2023/0002561 | A1 | 1/2023 | Lobert et al. | |

FOREIGN PATENT DOCUMENTS

| | | | | |
|---|---|---|---|---|
| CN | 103755157 A | * 4/2014 | | |
| CN | 106 282 444 | 1/2017 | | |
| CN | 106 367 988 | 2/2017 | | |
| CN | 107 603 294 | 1/2018 | | |
| CN | 108 708 185 | 10/2018 | | |
| DE | 31 01 457 | 7/1982 | | |
| EP | 0 057 398 | 8/1982 | | |
| EP | 2 607 401 | 6/2013 | | |
| EP | 3 418 260 | 12/2018 | | |
| WO | WO 01/09054 | 2/2001 | | |
| WO | WO-02079364 A1 | * 10/2002 | | C11D 1/528 |
| WO | WO 2005/066237 | 7/2005 | | |
| WO | WO 2015/153712 | 10/2015 | | |
| WO | WO 2016/069970 | 5/2016 | | |
| WO | WO 2024/046954 | 3/2024 | | |

OTHER PUBLICATIONS

English translation of CN-103755157-A (Year: 2014).*

U.S. Appl. No. 17/706,552, filed Mar. 28, 2022, Reibold.

U.S. Appl. No. 17/853,058, filed Jun. 29, 2022, Lobert.

European Search Report and Search Opinion for corresponding EP 21 16 5440, filed Mar. 19, 2021; with partial English language machine translation of the Search Opinion attached.

* cited by examiner

*Primary Examiner* — Randy P Gulakowski

*Assistant Examiner* — Audra J Destefano

(74) *Attorney, Agent, or Firm* — Law Office of: Michael A, Sanzo, LLC

(57) ABSTRACT

The use of polyamine- and/or polyalkanolamine-based carboxylic acid derivatives as additives in aqueous polymer dispersions for production of porous polymer coatings, preferably for production of porous polyurethane coatings, is described.

16 Claims, No Drawings

USE OF POLYAMINE- AND/OR POLYALKANOLAMINE-BASED CARBOXYLIC ACID DERIVATIVES IN AQUEOUS POLYURETHANE DISPERSIONS

CROSS REFERENCE TO RELATED APPLICATIONS

The present application claims priority under 35 USC § 119 to European application EP 21165440, filed on Mar. 29, 2021, the contents of which is incorporated herein by reference in its entirety.

FIELD OF THE INVENTION

The present invention is in the field of plastics coatings and imitation leathers.

It relates more particularly to the production of porous polymer coatings, preferably porous polyurethane coatings, using polyamine- and/or polyalkanolamine-based carboxylic acid derivatives as additives.

BACKGROUND OF THE INVENTION

Textiles coated with plastics, for example imitation leathers, generally consist of a textile carrier onto which is laminated a porous polymer layer which has in turn been coated with a top layer or a topcoat.

The porous polymer layer in this context preferably has pores in the micrometre range and is air-permeable and hence breathable, i.e. permeable to water vapour, but water-resistant. The porous polymer layer often comprises porous polyurethane. For environmentally friendly production of PU-based imitation leather, a method based on aqueous polyurethane dispersions, called PUDs, has recently been developed. These generally consist of polyurethane microparticles dispersed in water; the solids content is usually in the range of 30-60% by weight. For production of a porous polyurethane layer, these PUDs are mechanically foamed, coated onto a carrier (layer thicknesses typically between 300-2000 μm) and then dried at elevated temperature. During this drying step, the water present in the PUD system evaporates, which results in formation of a film of the polyurethane particles. In order to further increase the mechanical strength of the film, it is additionally possible to add hydrophilic (poly)isocyanates or carbodiimides to the PUD system during the production process, and these can react with free OH radicals present on the surface of the polyurethane particles during the drying step, thus leading to additional crosslinking of the polyurethane film.

Both the mechanical and the tactile properties of PUD coatings thus produced are determined to a crucial degree by the cell structure of the porous polyurethane film. In addition, the cell structure of the porous polyurethane film affects the air permeability and breathability of the material. Particularly good properties can be achieved here with very fine, homogeneously distributed cells. A customary way of influencing the cell structure during the above-described production process is to add foam stabilizers to the PUD system before or during the mechanical foaming. A first effect of appropriate stabilizers is that sufficient amounts of air can be beaten into the PUD system during the foaming operation. Secondly, the foam stabilizers have a direct effect on the morphology of the air bubbles produced. The stability of the air bubbles is also influenced to a crucial degree by the type of stabilizer. This is important especially during the drying of foamed PUD coatings, since it is possible in this way to prevent drying defects such as cell coarsening or drying cracks.

The prior art discloses a number of ionic and nonionic surfactants which can be used for production of porous, PUD-based textile composite materials. Especially preferred in this context are usually anionic surfactants based on ammonium stearate; see, for example, US 2015/0284902 A1 or US 2006 0079635 A1.

However, the use of corresponding ammonium stearate-based stabilizers is associated with a number of drawbacks. A significant drawback here is that ammonium stearate has a very high migration capacity in the finished imitation leather. The effect of this is that surfactant molecules accumulate at the surface of the imitation leather with time, which can result in white discoloration at the leather surface. Furthermore, this surfactant migration can result in a greasy film that is perceived as unpleasant on the surface of the imitation leather, especially when corresponding materials come into contact with water.

A further drawback of ammonium stearate is that it forms insoluble lime soaps on contact with hard water. In the case of contact of imitation leather produced on the basis of ammonium stearate with hard water, white efflorescence can thus arise at the imitation leather surface, which is undesirable especially in the case of dark-coloured leather.

Yet another drawback of ammonium stearate-based foam stabilizers is that they do permit efficient foaming of aqueous polyurethane dispersions, but often lead to quite a coarse and irregular foam structure. This can have an adverse effect on the optical and tactile properties of the finished imitation leather.

Yet another drawback of ammonium stearate is that the PUD foams produced often have inadequate stability, which can lead to drawbacks in the processing thereof, especially in the drying of the PUD foams at elevated temperatures. A consequence of this would be, for example, that corresponding foams have to be dried relatively gently and slowly, which in turn leads to longer process times in imitation leather production.

A further drawback of ammonium stearate is that it generally has to be used in combination with other surfactants in order to be able to arrive at an adequate foam stability at all; the prior art here describes sulfosuccinamates, for example. These additional components lead to elevated complexity in use.

SUMMARY OF THE INVENTION

The problem addressed by the present invention was therefore that of providing additives for production of PUD-based foam systems and foam coatings that enable efficient foaming of PUD systems without having to accept the drawbacks associated with the use of ammonium stearate that are set out in the prior art. As an alternative to ammonium stearate-based foam stabilizers, polyol esters and polyol ethers were identified in the past as effective foam additives for aqueous polyurethane dispersions. These structures are described, for example, in documents EP3487945 A1 and WO2019042696A1. It has now been found that, surprisingly, the use of polyamine- and/or polyalkanolamine-based carboxylic acid derivatives likewise enables the solution of the stated problem.

The present invention therefore provides for the use of polyamine- and/or polyalkanolamine-based carboxylic acid derivatives as additives, preferably as foam additives, in aqueous polymer dispersions, preferably aqueous polyurethane dispersions, preferably for production of porous polymer coatings, especially for production of porous polyurethane coatings.

The inventive use of polyamine- and/or polyalkanolamine-based carboxylic acid derivatives surprisingly has manifold advantages here.

One advantage is that polyamine- and/or polyalkanolamine-based carboxylic acid derivatives enable particularly efficient foaming of aqueous PUD systems. The foams thus produced are notable here for an exceptionally fine pore structure with particularly homogeneous cell distribution, which in turn has a very advantageous effect on the mechanical and tactile properties of the porous polymer coatings which are produced on the basis of these foams. In addition, it is possible in this way to improve the air permeability and breathability of the coating.

Yet another advantage is that polyamine- and/or polyalkanolamine-based carboxylic acid derivatives enable the production of particularly stable foams. This firstly has an advantageous effect on their processibility. Secondly, the elevated foam stability has the advantage that, during the drying of corresponding foams, drying defects such as cell coarsening or drying cracks can be avoided.

Furthermore, the improved foam stability enables quicker drying of the foams, which offers processing advantages both from an environmental and from an economic point of view.

Yet another advantage is that the polyamine- and/or polyalkanolamine-based carboxylic acid derivatives according to the invention, in the finished imitation leather, have barely any migration capacity, if any, and thus do not lead to unwanted surface discoloration or efflorescence. Furthermore, the surfactants according to the invention are barely sensitive to hard water, if at all.

An additional advantage of the polyamine- and/or polyalkanolamine-based carboxylic acid derivatives according to the invention is that they can lead to an increase in viscosity of the foamed, undried dispersion. This in turn can have an advantageous effect on the processibility of the foam. Furthermore, as the case may be, it may be possible as a result to dispense with the use of additional thickeners for adjusting the foam viscosity, or to reduce the use concentration thereof, which brings economic advantages.

A further advantage of the polyamine- and/or polyalkanolamine-based carboxylic acid derivatives according to the invention is that they lead to adequate stabilization of foams based on aqueous polymer dispersions even without the use of further surfactants. This can reduce the complexity in the assembly of a suitable foam formulation on the part of the user.

A further advantage of the polyamine- and/or polyalkanolamine-based carboxylic acid derivatives according to the invention is that they feature excellent hydrolysis stability over a wide pH range and hence can also be used in polymer dispersions having very low or very high pH values. The invention is described further and by way of example hereinafter, without any intention that the invention be restricted to these illustrative embodiments. Where ranges, general formulae or compound classes are specified below, these are intended to include not only the corresponding ranges or groups of compounds which are explicitly mentioned but also all subranges and subgroups of compounds which can be obtained by removing individual values (ranges) or compounds. Where documents are cited in the context of the present description, the entire content thereof, particularly with regard to the subject matter that forms the context in which the document has been cited, is fully incorporated into the disclosure content of the present invention. Unless otherwise stated, percentages are in percent by weight. Where parameters that have been determined by measurement are given hereinbelow, the measurements have been carried out at a temperature of 25° C. and a pressure of 101 325 Pa, unless otherwise stated. Where chemical (empirical) formulae are used in the present invention, the specified indices can be not only absolute numbers but also average values. For polymeric compounds, the indices preferably represent average values. Structural and empirical formulae presented in the present invention are representative of all isomers that are possible by differing arrangement of the repeating units.

DETAILED DESCRIPTION OF THE INVENTION

The expression "polyamine- and/or polyalkanolamine-based carboxylic acid derivatives" in the context of this invention especially encompasses compounds obtainable by reacting at least one polyamine and/or one polyalkanolamine with at least one acyl group donor, for example a carboxylic acid, a carboxylic ester, a carbonyl halide or a carboxylic anhydride, particular preference being given to carboxylic acids. For these reactions, it is optionally possible if required to use suitable catalysts, for example organic or inorganic acids, for example p-toluenesulfonic acid, sulfuric acid or methanesulfonic acid, acidic salts, carbonyl chlorides, metals or amphoteric metal oxides, metal alkoxides or carboxylates, for example tetrabutyl (ortho)titanate or tin(II) 2-ethylhexanoate. Further optional auxiliaries such as activated carbon or entraining agents for removal of water may likewise be used. Corresponding reactions are known to the person skilled in the art and are described, for example, in *Römpp—Chemie Lexikon* (*Thieme-Verlag,* 1996).

The term "polyamine" over the entire scope of the present invention especially includes saturated or unsaturated, open-chain or cyclic, linear or branched organic compounds having at least two or more terminal amine groups, the chains of which may have secondary or tertiary amino groups.

The term "polyalkanolamine" over the entire scope of the present invention especially includes saturated or unsaturated, open-chain or cyclic, linear or branched organic compounds having at least two or more terminal OH groups, the chains of which may be interrupted by secondary or tertiary amino groups and/or ether groups, wherein these compounds simultaneously contain at least one amine group and at least two OH groups.

The expression "polyamine- and/or polyalkanolamine-based carboxylic acid derivatives" over the entire scope of the present invention also includes the alkoxylated adducts thereof that can be obtained by reaction of a polyamine- and/or polyalkanolamine-based carboxylic acid derivative with alkylene oxides, for example ethylene oxide, propylene oxide and/or butylene oxide.

The preparation of the polyamine- and/or polyalkanolamine-based carboxylic acid derivatives according to the invention by the use of monocarboxylic acids and/or polyfunctional di- and/or tricarboxylic acids is a particularly preferred embodiment of the present invention. Preferred carboxylic acids usable for preparation of the polyamine- and/or polyalkanolamine-based carboxylic acid derivatives according to the invention conform to the general form R—C(O)OH where R is a monovalent aliphatic saturated or unsaturated hydrocarbon radical having 3 to 39 carbon atoms, preferably 7 to 21 and more preferably 9 to 17 carbon atoms. Especially preferred here are carboxylic acids selected from butyric acid (butanoic acid), caproic acid (hexanoic acid), caprylic acid (octanoic acid), pelargonic acid (nonanoic acid), capric acid (decanoic acid), lauric acid (dodecanoic acid), myristic acid (tetradecanoic acid), palmitic acid (hexadecanoic acid), stearic acid (octadecanoic acid), arachidic acid (eicosanoic acid), behenic acid (docosanoic acid), lignoceric acid (tetracosanoic acid), palmitoleic acid ((Z)-9-hexadecenoic acid), oleic acid ((Z)-9-octadecenoic acid), elaidic acid ((E)-9-octadecenoic acid), cis-vaccenic acid ((Z)-11-octadecenoic acid), linoleic acid ((9Z, 12Z)-9,12-octadecadienoic acid), alpha-linolenic acid ((9Z, 12Z,15Z)-9,12,15-octadecatrienoic acid), gamma-linolenic acid ((6Z,9Z,12Z)-6,9,12-octadecatrienoic acid), di-homo-gamma-linolenic acid ((8Z,11Z,14Z)-8,11,14-eicosatrienoic acid), arachidonic acid ((5Z,8Z,11Z,14Z)-5,8,11,14-eicosatetraenoic acid), erucic acid ((Z)-13-docosenoic acid), nervonic acid ((Z)-15-tetracosenoic acid), ricinoleic acid, hydroxystearic acid and/or undecylenic acid, and also mixtures thereof, for example rapeseed oil acid, soya fatty acid, sunflower fatty acid, peanut fatty acid and tall oil fatty acid. Very particular preference is given to palmitic acid and/or stearic acid, and especially the mixtures of these substances. Preference is given here in accordance with the invention both to the pure fatty acids and to their technical grade qualities having chain length distributions, or containing mixtures of fatty acids of different chain length. Likewise preferred in accordance with the invention are partly hydrogenated fatty acids.

Sources of suitable fatty acids may be vegetable or animal fat, oils or waxes. For example, it is possible to use: pork lard, beef tallow, goose fat, duck fat, chicken fat, horse fat, whale oil, fish oil, palm oil, olive oil, avocado oil, seed kernel oils, coconut oil, palm kernel oil, cocoa butter, cottonseed oil, pumpkinseed oil, maize kernel oil, sunflower oil, wheatgerm oil, grapeseed oil, sesame oil, linseed oil, soybean oil, peanut oil, lupin oil, rapeseed oil, mustard oil, castor oil, jatropha oil, walnut oil, jojoba oil, lecithin, for example based on soya, rapeseed or sunflowers, bone oil, neatsfoot oil, borage oil, lanolin, emu oil, deer tallow, marmot oil, mink oil, safflower oil, hemp oil, pumpkin oil, evening primrose oil, tall oil, and also carnauba wax, beeswax, candelilla wax, ouricury wax, sugarcane wax, retamo wax, caranday wax, raffia wax, esparto wax, alfalfa wax, bamboo wax, hemp wax, Douglas fir wax, cork wax, sisal wax, flax wax, cotton wax, dammar wax, tea wax, coffee wax, rice wax, oleander wax or wool wax.

In addition, it may be advantageous when the polyamine- and/or polyalkanolamine-based carboxylic acid derivatives according to the invention are prepared using polyfunctional di- and/or tricarboxylic acids. Preference is given here to aliphatic linear or branched di- and/or tricarboxylic acids having a chain length of 2 to 18 carbon atoms and/or (technical grade) dimer fatty acids that were obtained by catalytic dimerization of unsaturated fatty acids having 12 to 22 carbon atoms. Examples of corresponding polyfunctional acids are oxalic acid, malonic acid, succinic acid, glutaric acid, adipic acid, pimelic acid, suberic acid, azelaic acid, sebacic acid, brassylic acid, thapsic acid, tartronic acid, tartaric acid, malic acid, itaconic acid and/or citric acid. Especially preferably, it is possible to use polyfunctional di- and/or tricarboxylic acids in combination with monofunctional carboxylic acids as described above, by means of which crosslinked polyamine- and/or polyalkanolamine-based carboxylic acid derivatives are obtainable.

The polyamines used for preparation of the carboxylic acid derivatives according to the invention are preferably selected from diethylenetriamine, triethylenetetraamine, tetraethylenepentamine, pentaethyleneheptaamine, dipropylenetriamine, tripropylenetetraamine, tetraethylenepentamine, pentaethyleneheptaamine, spermine, spermidine, and N-alkylated, N-methylated derivatives of these compounds, polyethyleneimine, polypropyleneimine and/or amine group-bearing (co)polymers, especially (co)polymers based on allylamine and/or vinylamine, and mixtures of these substances, particular preference being given to polyethyleneimines.

The polyalkanolamines used for preparation of the carboxylic acid derivatives according to the invention are preferably selected from polydiethanolamine, polydipropanolamine, polydiisoproanolamine, polytriethanolamine, polytripropanolamine, polytriisopropanolamine, polyetheramines, especially based on polyethylene oxide, polypropylene oxide and polyethylene oxide-polypropylene oxide copolymers and/or (co)polymers bearing OH and amine groups, especially copolymers based on allyl alcohol, vinyl alcohol, allylamine and vinylamine, and mixtures of these substances, with particular preference for polytriisopropanolamine in particular.

In the context of the present invention, moreover, preference is given to those polyalkanolamines obtainable by condensation of N-(hydroxyalkyl)amines, preference being given in particular to trialkanolamines of the general formula 1

Formula 1

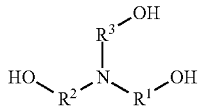

where the $R^1$ to $R^3$ radicals are independently identical or different 1,2-alkylene groups having 2 to 4 carbon atoms. In addition, preference is also given to those polyalkanolamines obtainable by cocondensation of N-(hydroxyalkyl)amines, preference being given especially to trialkanolamines of the general formula 1, and other molecules bearing hydroxyl groups, for example pentaerythritol, sorbitol, glycol, glycerol or polyglycerol, as described, for example, in document EP 0 057 398.

In addition, it is also possible to use alkoxylated adducts of polyamines and polyalkanolamines for preparation of the carboxylic acid derivatives according to the invention, which can be obtained by reaction of polyamines and polyalkanolamines, especially as described in detail above, with alkylene oxides, for example ethylene oxide, propylene oxide and/or butylene oxide, as described, for example, in document US20100234631 A1.

If the carboxylic acid derivatives according to the invention are prepared using polyethylenimines, these are preferably obtainable by ring-opening polymerization of ethyleneimine. In addition, preference is given especially to those polyethyleneimines having an average molar mass of less than 25 000 g/mol, more preferably of less than 12 500 g/mol, even more preferably of less than 5000 g/mol, even more preferably of less than 2000 g/mol. Average molar mass can be determined here preferably by gel permeation chromatography (GPC). For this purpose, for example, it is possible to use the SECcurity2 GPC system from PCC, calibrated against polystyrene.

If the polyamine-based carboxylic acid derivatives according to the invention are prepared using (co)polymers bearing amine groups, these preferably have at least one repeat unit A of the general formula 2

Formula 2

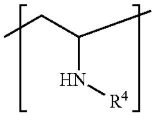

and/or at least one repeat unit B of the general formula 3

Formula 3

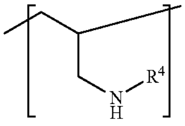

where the $R^4$ radicals are identical or different monovalent aliphatic or aromatic, saturated or unsaturated hydrocarbon radicals having 1 to 15 carbon atoms, preferably 1 to 10, more preferably having 1 to 5 carbon atoms or H, more preferably H.

In the case of polyalkanolamine-based carboxylic acid derivatives, in the preparation of which copolymers bearing OH and amine groups are used, preference is given especially to those copolymers having, as well as the repeat units A and/or B, also at least one repeat unit C of the formula 4

Formula 4

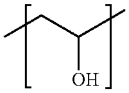

and/or at least one repeat unit D of the general formula 5

Formula 5

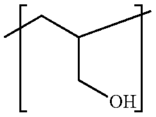

It is likewise preferred when optionally further monoethylenically unsaturated comonomers or comonomer mixtures are incorporated by polymerization as well as the repeat units A to D into the polymers used for preparation of the carboxylic acid derivatives according to the invention, in order thus to arrive at further-modified polymers. These may be nonionic, cationic or anionic monomers. Preferred nonionic comonomers here are unsaturated alcohols, such as vinyl alcohol or allyl alcohol, and alkoxylates thereof, unsaturated nitriles, aliphatic or aromatic olefins, N-vinyllactams, for example N-vinylpyrrolidone or N-vinylcaprolactam, vinyl esters of organic carboxylic acids, esters of monoethylenically unsaturated carboxylic acids, and amides of monoethylenically unsaturated carboxylic acids. Preferred cationic comonomers are vinylimidazole and monomers containing vinylimidazole units, alkyl derivatives and quaternization products thereof, vinylpyridines and quaternization products thereof, basic esters of ethylenically unsaturated carboxylic acids with amino alcohols, and basic amides of ethylenically unsaturated carboxylic acids with N,N-dialkylaminoalkylamines. Preferred anionic comonomers are $\alpha,\beta$-unsaturated monocarboxylic acids, unsaturated dicarboxylic acids and partial esters of unsaturated dicarboxylic acids.

It is additionally preferable in the context of the present invention when the polyamine- and/or polyalkanolamine-based carboxylic acid derivatives according to the invention are prepared using (co)polymers bearing amine groups and/or amine and OH groups and having an average molar mass of less than 25 000 g/mol, more preferably of less than 12 500 g/mol, even more preferably of less than 5000 g/mol, even more preferably of less than 2000 g/mol. Average molar mass can be determined here preferably by gel permeation chromatography (GPC). For this purpose, for example, it is possible to use the SECcurity2 GPC system from PCC, calibrated against polystyrene.

In the context of the present invention, it is preferable when polyamine and/or polyalkanolamine and carboxylic acids are reacted in such a way that the molar ratio of amine and OH functions reactive toward carboxylic acids to carboxylic acids is in the range of 5:1-1.5:1, more preferably in the range of 4:1-1.7:1, even more preferably in the range of 3.5:1-1.9:1, even more preferably in the range of 3:1-2:1.

As already described, the present invention envisages the use of polyamine- and/or polyalkanolamine-based carboxylic acid derivatives as described above as additives in aqueous polymer dispersions, preferably in aqueous polyurethane dispersions. The polymer dispersions here are preferably selected from the group of aqueous polystyrene dispersions, polybutadiene dispersions, poly(meth)acrylate dispersions, polyvinyl ester dispersions and/or polyurethane dispersions. The solids content of these dispersions is preferably in the range of 20-70% by weight, more preferably in the range of 25-65% by weight. Particular preference is given in accordance with the invention to the use of polyamine- and/or polyalkanolamine-based carboxylic acid derivatives as additives in aqueous polyurethane dispersions. Especially preferable here are polyurethane dispersions based on polyester polyols, polyesteramide polyols, polycarbonate polyols, polyacetal polyols and/or polyether polyols.

In the context of the present invention, it is preferable when the concentration of the polyamine- and/or polyalkanolamine-based carboxylic acid derivatives based on the total weight of the aqueous polymer dispersion is in the range of 0.1-20% by weight, more preferably in the range of 0.2-15% by weight, especially preferably in the range of 0.5-10% by weight.

Preference is given to using the polyamine- and/or polyalkanolamine-based carboxylic acid derivatives in aqueous polymer dispersions as foaming aids or foam stabilizers for foaming of the dispersions, i.e. as foaming additives. In addition, however, they may also be used as drying auxiliaries, levelling additives, wetting agents and rheology additives, which likewise corresponds to preferred embodiments of the present invention.

As well as the polyamine- and/or polyalkanolamine-based carboxylic acid derivatives according to the invention, the aqueous polymer dispersions may also comprise further additions/formulation components such as dyes or pigments, fillers, flatting agents, stabilizers such as hydrolysis or UV stabilizers, antioxidants, absorbers, crosslinkers, levelling additives, thickeners and/or further cosurfactants.

The polyamine- and/or polyalkanolamine-based carboxylic acid derivatives can be added to the aqueous dispersion either in pure or blended form in a suitable solvent. Preferred solvents in this connection are selected from water, propylene glycol, dipropylene glycol, polypropylene glycol, butyldiglycol, butyltriglycol, ethylene glycol, diethylene glycol, polyethylene glycol, polyalkylene glycols based on ethylene oxide, propylene oxide, butylene oxide and/or styrene oxide (EO, PO, BO, SO), alcohol alkoxylates based on EO, PO, BO and/or SO, and mixtures of these substances, very particular preference being given to aqueous dilutions or blends. Blends or dilutions of polyamine- and/or polyalkanolamine-based carboxylic acid derivatives preferably contain at least 5% by weight, more preferably at least 10% by weight, even more preferably at least 15% by weight, of the polyamine- and/or polyalkanolamine-based carboxylic acid derivatives.

In the case of aqueous dilutions or blends of the polyamine- and/or polyalkanolamine-based carboxylic acid derivatives according to the invention, it may be advantageous when hydrotropic compounds are added to the blend. Hydrotropic compounds here are water-soluble organic compounds consisting of a hydrophilic part and a hydrophobic part, but are too low in molecular weight to have surfactant properties. The term "hydrotropic compounds" is known to those skilled in the art. Preferred hydrotropic compounds in the context of the present invention are alkali metal and ammonium toluenesulfonates, alkali metal and ammonium xylenesulfonates, alkali metal and ammonium naphthalenesulfonates, alkali metal and ammonium cumenesulfonates, and phenol alkoxylates, especially phenol ethoxylates, having up to 6 alkoxylate units.

It may also be advantageous for the polyamine- and/or polyalkanolamine-based carboxylic acid derivatives to be used not in pure form but in combination with further cosurfactants as additives in aqueous polymer dispersions, preferably in aqueous polyurethane dispersions. These may be used, for example, for improved system compatibility or, in the case of pre-formulated surfactant mixtures, for improved formulation properties. Cosurfactants preferred in accordance with the invention in this context are, for example, free fatty alcohols, fatty acid amides, ethylene oxide-propylene oxide block copolymers, betaines, for example amidopropyl betaines, amine oxides, quaternary ammonium surfactant, amphoacetates, ammonium and/or alkali metal salts of fatty acids, alkyl sulfates, alkyl ether sulfates, alkylsulfonates, alkylbenzenesulfonates, alkyl phosphates, alkyl sulfosuccinates, alkyl sulfosuccinamates and/or alkyl sarcosinates and mixtures of these substances, very particular preference being given to free fatty alcohols, preferably having 12 to 40, more preferably having 14-30, even more preferably having 16-24, carbon atoms, and alkyl sulfates having 12 to 40, more preferably having 14-30, even more preferably having 16-24, carbon atoms, and mixtures of these substances. In addition, the cosurfactant may comprise silicone-based surfactants, for example trisiloxane surfactants or polyether siloxanes. In the case of ammonium and/or alkali metal salts of fatty acids, it is preferable when they contain less than 25% by weight of stearate salts, and are especially free of stearate salts.

In the case of combinations of the polyamine- and/or polyalkanolamine-based carboxylic acid derivatives according to the invention with further cosurfactants, as described above, it is especially preferred when these combinations include between 1% and 60% by weight, preferably between 2% and 50% by weight, more preferably between 3% and 40% by weight, even more preferably between 5% and 30% by weight, of cosurfactant, based on the combination of polyamine- and/or polyalkanolamine-based carboxylic acid derivatives according to the invention and cosurfactant.

Since, as described above, the inventive use of polyamine- and/or polyalkanolamine-based carboxylic acid derivatives leads to a distinct improvement in porous polymer coatings produced from aqueous polymer dispersions, the present invention likewise provides aqueous polymer dispersions comprising at least one of the polyamine- and/or polyalkanolamine-based carboxylic acid derivatives, as described in detail above.

The present invention still further provides porous polymer layers which have been produced from aqueous polymer dispersions, obtained with the inventive use of polyamine- and/or polyalkanolamine-based carboxylic acid derivatives, as described in detail above.

Preferably, the porous polymer coatings according to the invention can be produced by a process comprising the steps of a) providing a mixture comprising at least one aqueous polymer dispersion, at least one polyamine- and/or polyalkanolamine-based carboxylic acid derivative according to the invention, and optionally further additives,
b) foaming the mixture to give a foam,
c) optionally adding at least one thickener to adjust the viscosity of the wet foam,
d) applying a coating of the foamed polymer dispersion to a suitable carrier,
e) drying/curing the coating.

The porous polymer coatings have pores preferably in the micrometre range, preferably with an average cell size of less than 350 μm, further preferably less than 200 μm, especially preferably less than 150 μm, most preferably less than 100 μm. The average cell size can preferably be determined by microscopy, preferably by electron microscopy. For this purpose, a cross section of the porous polymer coating is viewed by means of a microscope with sufficient magnification and the size of at least 25 cells is ascertained. The average cell size is then calculated as the arithmetic average of the cells or cell sizes viewed.

With a view to preferred configurations, especially with a view to the polyamine- and/or polyalkanolamine-based carboxylic acid derivatives and polymer dispersions that are usable with preference in the process, reference is made to the preceding description and also to the aforementioned preferred embodiments, especially as detailed in the claims.

It is made clear that the process steps of the process according to the invention as set out above are not subject to any fixed sequence in time. For example, process step c) can be executed at an early stage, at the same time as process step a).

It is a preferred embodiment of the present invention when, in process step b), the aqueous polymer dispersion is foamed by the application of high shear forces. The foaming can be effected here with the aid of shear units familiar to the person skilled in the art, for example Dispermats, dissolvers, Hansa mixers or Oakes mixers.

In addition, it is preferable when the wet foam produced at the end of process step c) has a viscosity of at least 5, preferably of at least 10, more preferably of at least 15 and even more preferably of at least 20 Pas, but of not more than 500 Pas, preferably of not more than 300 Pas, more preferably of not more than 200 Pas and even more preferably of not more than 100 Pas. The viscosity of the foam can be determined here preferably with the aid of a Brookfield viscometer, LVTD model, equipped with an LV-4 spindle.

Corresponding test methods for determination of the wet foam viscosity are known to those skilled in the art.

It is a preferred embodiment of the present invention when, in process step b), the form is very homogeneous and has very fine cells. The person skilled in the art will be able to verify this if desired in a customary manner by simple direct visual inspection by the naked eye or with optical aids, for example magnifying glasses, microscopes, drawing on their customary experience. "Fine cells" relates to cell size. The smaller the average cell size, the finer the foam. If desired, the fine cell content can be determined, for example, with a light microscope or with a scanning electron microscope. "Homogeneous" means the cell size distribution. A homogeneous foam has a very narrow cell size distribution, such that all cells are about the same size. This could in turn be quantified with a light microscope or with a scanning electron microscope.

As already described above, additional thickeners can be added to the system to adjust the wet foam viscosity.

Preferably, the thickeners which can be used advantageously in the context of the invention are selected from the class of the associative thickeners. Associative thickeners here are substances which lead to a thickening effect through association at the surfaces of the particles present in the polymer dispersions. The term is known to those skilled in the art. Preferred associative thickeners are selected here from polyurethane thickeners, hydrophobically modified polyacrylate thickeners, hydrophobically modified polyether thickeners and hydrophobically modified cellulose ethers. Very particular preference is given to polyurethane thickeners. In addition, it is preferable in the context of the present invention when the concentration of the thickeners based on the overall composition of the dispersion is in the range of 0.01-10% by weight, more preferably in the range of 0.05-5% by weight, most preferably in the range of 0.1-3% by weight.

In the context of the present invention, it is additionally preferable when, in process step d), coatings of the foamed polymer dispersion with a layer thickness of 10-10 000 μm, preferably of 50-5000 μm, more preferably of 75-3000 μm, even more preferably of 100-2500 μm, are produced. Coatings of the foamed polymer dispersion can be produced by methods familiar to the person skilled in the art, for example knife coating. It is possible here to use either direct or indirect coating processes (called transfer coating).

It is also preferable in the context of the present invention when, in process step e), the drying of the foamed and coated polymer dispersion is effected at elevated temperatures. Preference is given here in accordance with the invention to drying temperatures of min. 50° C., preferably of 60° C., more preferably of at least 70° C. In addition, it is possible to dry the foamed and coated polymer dispersions in multiple stages at different temperatures, in order to avoid the occurrence of drying defects. Corresponding drying techniques are widespread in industry and are known to those skilled in the art.

As already described, process steps c)-e) can be effected with the aid of widely practised methods known to those skilled in the art. An overview of these is given, for example, in "Coated and laminated Textiles" (Walter Fung, CR-Press, 2002).

In the context of the present invention, preference is given especially to those porous polymer coatings comprising polyamine- and/or polyalkanolamine-based carboxylic acid derivatives and having an average cell size less than 350 μm, preferably less than 200 μm, especially preferably less than 150 μm, most preferably less than 100 μm. The average cell size can preferably be determined by microscopy, preferably by electron microscopy. For this purpose, a cross section of the porous polymer coating is viewed by means of a microscope with sufficient magnification and the size of at least 25 cells is ascertained. In order to obtain sufficient statistics for this evaluation method, the magnification of the microscope chosen should preferably be such that at least 10×10 cells are present in the observation field. The average cell size is then calculated as the arithmetic average of the cells or cell sizes viewed. This determination of cell size by means of microscopy is familiar to those skilled in the art.

The porous polymer layers (or polymer coatings) according to the invention, comprising at least one of the polyamine- and/or polyalkanolamine-based carboxylic acid derivatives according to the invention and optionally further additives, may be used, for example, in the textile industry, for example for imitation leather materials, in the construction industry, in the electronics industry, in the sports industry or in the automobile industry. For instance, on the basis of the porous polymer coatings according to the invention, it is possible to produce everyday articles such as shoes, insoles, bags, suitcases, small cases, clothing, automobile parts, preferably seat covers, coverings of door parts, dashboard parts, steering wheels and/or handles, and gearshift gaiters, fitout articles such as desk pads, cushions or seating furniture, gap fillers in electronic devices, cushioning and damping materials in medical applications, or adhesive tapes. These everyday articles form a further part of the subject-matter of this invention.

EXAMPLES

Substances:

IMPRANIL® DLU: aliphatic polycarbonate ester-polyether-polyurethane dispersion from Covestro.

REGEL® WX 151: aqueous polyurethane dispersion from Cromogenia.

CROMELASTIC® PC 287 PRG: aqueous polyurethane dispersion from Cromogenia.

STOKAL® STA: ammonium stearate (about 30% in $H_2O$) from Bozetto.

STOKAL® SR: tallow fat-based sodium sulfosuccinamate (about 35% in $H_2O$) from Bozetto.

ECO Pigment Black: aqueous pigment dispersion (black) from Cromogenia.

TEGOWET® 250: polyethersiloxane-based levelling additive from Evonik.

ORTEGOL® PV 301: polyurethane-based associative thickener from Evonik.

REGEL® TH 27: isocyanate-based crosslinking additive from Cromogenia.

Viscosity Measurements:

All viscosity measurements were conducted with a Brookfield viscometer, LVTD, equipped with spindle #64, at a constant rotation speed of 12 rpm. For the viscosity measurements, the samples were transferred into a 100 ml jar into which the measurement spindle was immersed to a stipulated depth. The display of a constant viscometer measurement was always awaited.

Method of Determining Acid Value:

Suitable methods of determining acid value are especially those according to DGF C-V 2, DIN EN ISO 2114, Ph. Eur. 2.5.1, ISO 3682 and ASTM D 974.

Method of Determining Amine Value:

A suitable starting weight is dissolved in 50 ml of tetrahydrofuran and, after dissolution, 50 ml of acetic acid (anhydrous, 99-100%) are added. Thereafter, the sample is titrated in an automatic titrator against a 0.1 M solution of perchloric acid in dioxane.

Example 1: Synthesis of a Polyethyleneimine Palmitoylamide with 6.90 eq. of Palmitic Acid A mixture of palmitic acid (108.5 g, 0.423 mol, 6.90 eq., C16≥99%) and polyethyleneimine (49.05 g, 0.0613 mol, 800 g/mol, 1.00 eq., Lupasol® FG from BASF) was heated to 170° C. while stirring and passing $N_2$ through, in the course of which the water formed was continuously removed by distillation until an acid value of 3.2 mg KOH/g and an amine value of 226 mg KOH/g had been attained.

Example 2: Synthesis of a Polyethyleneimine Palmitoylamide with 8.30 eq. of Palmitic Acid A mixture of palmitic acid (114.9 g, 0.448 mol, 8.30 eq., C16≥99%) and polyethyleneimine (43.2 g, 0.0540 mol, 800 g/mol, 1.00 eq., Lupasol® FG from BASF) was heated to 175° C. while stirring and passing $N_2$ through, in the course of which the water formed was continuously removed by distillation until an acid value of 2.1 mg KOH/g and an amine value of 173 mg KOH/g had been attained.

Example 3: Synthesis of a Polyethyleneimine Palmitoylamide with 10.3 eq. of Palmitic Acid A mixture of palmitic acid (121.9 g, 0.475 mol, 10.3 eq., C16≥99%) and polyethyleneimine (36.7 g, 0.0459 mol, 800 g/mol, 1.00 eq., Lupasol® FG from BASF) was heated to 175° C. while stirring and passing $N_2$ through, in the course of which the water formed was continuously removed by distillation until an acid value of 14.2 mg KOH/g and an amine value of 158 mg KOH/g had been attained.

Example 4: Blending of the Surfactants According to the Invention

The surfactants according to the invention from Examples 1-3 were blended according to the compositions detailed in Table 1 and then homogenized at 80° C.:

TABLE 1

Composition of surfactant blends used hereinafter

| | Surfactant 1 | Surfactant 2 | Surfactant 3 |
|---|---|---|---|
| Polyethyleneimine palmitoylamide from Example 1 | 19.7 g | — | — |
| Polyethyleneimine palmitoylamide from Example 2 | — | 19.7 g | — |
| Polyethyleneimine palmitoylamide from Example 3 | — | — | 19.7 g |
| Cetearyl sulfate | 1.6 g | 1.6 | 1.6 |
| Water | 59.1 g | 59.1 g | 59.1 g |
| Propylene glycol | 6.25 g | 6.25 g | 6.25 g |

Example 5: Foaming Tests

To test the efficacy of the additive combination according to the invention, a series of foaming experiments was conducted. For this purpose, in a first step, the IMPRANIL® DLU polyurethane dispersion from Covestro was used. The foam stabilizers used were the inventive surfactant formulations 1-3 (see table 1) and a combination of the two surfactants Stokal® STA (ammonium stearate) and Stokal® SR (sodium sulfosuccinamate) as comparison. Table 2 gives an overview of the compositions of the respective experiments.

All foaming experiments were conducted manually. For this purpose, polyurethane dispersion and surfactant were first placed in a 500 ml plastic cup and homogenized with a dissolver equipped with a disperser disc (diameter=6 cm) at 1000 rpm for 3 min. For foaming of the mixtures, the speed was then increased to 2000 rpm, ensuring that the dissolver disc was always immersed into the dispersion to a sufficient degree that a proper vortex formed. At this speed, the mixtures were foamed to a volume of about 425 ml. The mixture was then sheared at 1000 rpm for a further 15 minutes. In this step, the dissolver disc was immersed sufficiently deeply into the mixtures that no further air was introduced into the system, but the complete volume was still in motion.

TABLE 2

Overview of foam formulations

| | #1 | #2 | #3 | #4 |
|---|---|---|---|---|
| IMPRANIL ® DLU | 150 g | 150 g | 150 g | 150 g |
| Surfactant 1 | 5 g | — | — | — |
| Surfactant 2 | — | 5 g | — | — |
| Surfactant 3 | — | | 5 g | |
| Stokal ® STA | — | — | | 2 g |
| Stokal ® SR | — | — | | 2 g |
| Wet foam viscosity [mPa s] | 9200 | 7600 | 8200 | 4000 |

In all cases, fine homogeneous foams were obtained at the end of this foaming operation. It was noticeable that the foams which had been produced with inventive surfactants 1-3 had a higher viscosity (see Table 2). The foams were coated onto a siliconized polyester film with the aid of a film applicator (AB3220 from TQC) equipped with an applicator frame (coat thickness=800 μm) and then dried at 60° C. for 5 min and at 120° C. for a further 5 min.

Compared to sample #4, the dried inventive samples #1-#3 featured a more homogeneous macroscopic appearance and a more velvety feel. In electron microscopy studies, moreover, it was possible to ascertain a finer pore structure.

Example 6: Migration Tests

To assess the surface migration of the surfactants according to the invention, imitation leather materials were produced by the method that follows. First of all, a topcoat coating was applied to a siliconized polyester film (layer thickness 100 μm). This was then dried at 100° C. for 3 minutes. Subsequently, a foam layer was coated onto the dried topcoat layer (layer thickness 800 μm) and dried at 60° C. for 5 minutes and at 120° C. for 5 minutes. In a last step, an aqueous adhesive layer (layer thickness 100 μm) was coated onto the dried foam layer, and then a textile carrier was laminated onto the still-moist adhesive layer. The finished laminate was dried again at 120° C. for 5 minutes and then detached from the polyester film.

All coating and drying operations were performed here with a Labcoater LTE-S from Mathis AG. Topcoat and adhesive layer were formulated here in accordance with the compositions listed in Table 3; the foam layers used were the foam formulations listed in Table 2, which were foamed by the method described in Example 5.

TABLE 3

Topcoat and adhesive formulation for production of imitation leather materials

| | Topcoat | Adhesive |
|---|---|---|
| CROMELASTIC ® PC 287 PRG | 100 g | — |
| REGEL ® WX 151 | — | 100 g |
| ECO Pigment Black | 10 g | 5 g |
| TEGOWET ® 250 | 0.2 g | 0.2 g |
| REGEL ® TH 27 | 6 g | 6 g |
| ORTEGOL ® PV 301 | 7 g | 5 g |

For assessment of surfactant migration, the imitation leather samples, after production, were placed into water at 100° C. for 30 minutes and then dried at room temperature overnight. After this treatment, the comparative sample produced with the Stokal® STA/SR surfactants (foam formulation #4, Table 2) had distinctly visible white spots on the surface of the imitation leather, whereas this surface discoloration was not observed in the case of the samples produced with the surfactants according to the invention (foam formulation #1-#3, Table 2).

The invention claimed is:

1. An aqueous polyurethane dispersion, comprising polyamine- and/or polyalkanolamine-based carboxylic acid derivatives obtainable by a process consisting of reacting one or more polyamines selected from the group consisting of diethylenetriamine, triethylenetetraamines, tetraethylenepentamines, pentaethyleneheptaamine, dipropylenetriamine, tripropylenetetraamine, spermine, spermidine, and N-alkylated or N-methylated derivatives of these compounds, and/or one or more polyalkanolamines selected from the group consisting of polydipropanolamine, polydiisopropanolamine, polytriethanolamine, polytripropanolamine, polytriisopropanolamine, and polyetheramine, with at least one acyl group donor comprising rapeseed oil acid, soya fatty acid, sunflower fatty acid, peanut fatty acid, palmitic acid, stearic acid, or tall oil fatty acid, wherein the solids content of the dispersion is in the range of 20-70% by weight based on the overall dispersion, and wherein the concentration of the polyamine- and/or polyalkanolamine-based carboxylic acid derivatives is in the range of 0.2-20% by weight based on the total weight of the aqueous polyurethane dispersion.

2. The aqueous polyurethane dispersion of claim 1, wherein the polyalkanolamine is selected from the group consisting of: polydipropanolamine, polydiisopropanolamine, polytriethanolamine, polytripropanolamine, and mixtures thereof.

3. The aqueous polyurethane dispersion of claim 1, wherein the polyamine-based carboxylic acid derivatives are reaction products of at least one polyamine selected from the group consisting of: diethylenetriamine, triethylenetetramine, and tetraethylenepentamine.

4. The aqueous polyurethane dispersion of claim 1, wherein the polyamine-based carboxylic acid derivatives are reaction products of (co) polymers bearing amine groups with at least one carboxylic acid, where the (co) polymers bearing amine groups have at least one repeat unit A of general formula 2:

Formula 2

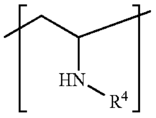

and/or at least one repeat unit B of general formula 3:

Formula 3

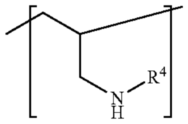

wherein the $R^4$ radicals are identical or different monovalent aliphatic or aromatic, saturated or unsaturated hydrocarbon radicals having 1 to 10 carbon atoms, or hydrogen, and with the proviso that the (co) polymer is selected from polyamines listed in claim 1.

5. The aqueous polyurethane dispersion of claim 1, wherein, in the preparation of polyamine- and/or polyalkanolamine-based carboxylic acid derivatives, polyamine and/or polyalkanolamine and carboxylic acids are reacted in such a way that the molar ratio of amine and OH functions reactive toward carboxylic acids to carboxylic acids is in the range of 5:1-1.5:1.

6. The aqueous polyurethane dispersion of claim 1, wherein the polyamine- and/or polyalkanolamine-based carboxylic acid derivatives are used in combination with at least one further cosurfactant, selected from the group consisting of: fatty alcohols, fatty acid amides, ethylene oxide-propylene oxide block copolymers, betaines, amine oxides, quaternary ammonium surfactants, amphoacetates, ammonium and/or alkali metal salts of fatty acids, alkyl sulfates, alkyl ether sulfates, alkylsulfonates, alkylbenzenesulfonates, alkyl phosphates, alkyl sulfosuccinates, alkyl sulfosuccinamates, alkyl sarcosinates and/or silicone-based cosurfactants and mixtures of these substances.

7. The aqueous polyurethane dispersion of claim 1, wherein the polyamine- and/or polyalkanolamine-based carboxylic acid derivatives are used in combination with at least one cosurfactant, wherein said cosurfactant is a free fatty alcohol having 12 to 40 carbon atoms, an alkyl sulfate having 12 to 40 carbon atoms, or a mixture of these substances.

8. The aqueous polyurethane dispersion of claim 1, wherein the concentration of the polyamine- and/or polyalkanolamine-based carboxylic acid derivatives based on the total weight of the aqueous polyurethane dispersion is in the range of 0.5-10% by weight.

9. The aqueous polyurethane dispersion of claim 2, wherein, in the preparation of polyamine- and/or polyalkanolamine-based carboxylic acid derivatives, polyamine and/or polyalkanolamine and carboxylic acids are reacted in such a way that the molar ratio of amine and OH functions reactive toward carboxylic acids to carboxylic acids is in the range of 5:1-1.5:1.

10. The aqueous polyurethane dispersion of claim 2, wherein the polyamine- and/or polyalkanolamine-based carboxylic acid derivatives are used in combination with at least one further cosurfactant, selected from the group consisting of: fatty alcohols, fatty acid amides, ethylene oxide-propylene oxide block copolymers, betaines, amine oxides, quaternary ammonium surfactants, amphoacetates, ammonium and/or alkali metal salts of fatty acids, alkyl sulfates, alkyl ether sulfates, alkylsulfonates, alkylbenzene-sulfonates, alkyl phosphates, alkyl sulfosuccinates, alkyl sulfosuccinamates, alkyl sarcosinates and/or silicone-based cosurfactants and mixtures of these substances.

11. The aqueous polyurethane dispersion of claim 2, wherein the polyamine- and/or polyalkanolamine-based carboxylic acid derivatives are used in combination with at least one cosurfactant, wherein said cosurfactant is a free fatty alcohol having 12 to 40 carbon atoms, an alkyl sulfate having 12 to 40 carbon atoms, or a mixture of these substances.

12. The aqueous polyurethane dispersion of claim 2, wherein the concentration of the polyamine- and/or polyalkanolamine-based carboxylic acid derivatives based on the total weight of the aqueous polyurethane dispersion is in the range of 0.5-10% by weight.

13. The aqueous polyurethane dispersion of claim 3, wherein the polyamine- and/or polyalkanolamine-based carboxylic acid derivatives are used in combination with at least one further cosurfactant, selected from the group consisting of: fatty alcohols, fatty acid amides, ethylene oxide-propylene oxide block copolymers, betaines, amine oxides, quaternary ammonium surfactants, amphoacetates, ammonium and/or alkali metal salts of fatty acids, alkyl sulfates, alkyl ether sulfates, alkylsulfonates, alkylbenzene-sulfonates, alkyl phosphates, alkyl sulfosuccinates, alkyl sulfosuccinamates, alkyl sarcosinates and/or silicone-based cosurfactants and mixtures of these substances.

14. The aqueous polyurethane dispersion of claim 3, wherein the polyamine- and/or polyalkanolamine-based carboxylic acid derivatives are used in combination with at least one cosurfactant, wherein said cosurfactant is a free fatty alcohol having 12 to 40 carbon atoms, an alkyl sulfate having 12 to 40 carbon atoms, or a mixture of these substances.

15. The aqueous polyurethane dispersion of claim 3, wherein the concentration of the polyamine- and/or polyalkanolamine-based carboxylic acid derivatives based on the total weight of the aqueous polyurethane dispersion is in the range of 0.5-10% by weight.

16. A process for producing a porous polyurethane coating, comprising the steps of:

a) providing a mixture comprising at least one aqueous polyurethane dispersion, according to claim 1;
b) foaming the mixture to give a foam;
c) optionally adding at least one thickener to adjust the viscosity of the wet foam;
d) applying a coating of the foamed polyurethane dispersion, to a suitable carrier;
e) drying the coating.

* * * * *